US011378709B2

(12) United States Patent
Steinsiek et al.

(10) Patent No.: US 11,378,709 B2
(45) Date of Patent: Jul. 5, 2022

(54) THROUGH TUBING ACOUSTIC IMAGING

(71) Applicant: Baker Hughes, A GE Company, LLC, Houston, TX (US)

(72) Inventors: Roger Steinsiek, Houston, TX (US); Douglas Patterson, Houston, TX (US)

(73) Assignee: BAKER HUGHES, A GE COMPANY, LLC., Houston, TX (US)

( * ) Notice: Subject to any disclaimer, the term of this patent is extended or adjusted under 35 U.S.C. 154(b) by 306 days.

(21) Appl. No.: 16/442,261

(22) Filed: Jun. 14, 2019

(65) Prior Publication Data

US 2019/0383959 A1    Dec. 19, 2019

Related U.S. Application Data

(60) Provisional application No. 62/685,348, filed on Jun. 15, 2018.

(51) Int. Cl.
*G01V 1/50* (2006.01)
*E21B 47/005* (2012.01)
(Continued)

(52) U.S. Cl.
CPC .............. *G01V 1/50* (2013.01); *E21B 47/005* (2020.05); *E21B 47/0025* (2020.05); *G01V 1/159* (2013.01)

(58) Field of Classification Search
CPC .... G01V 1/50; G01V 1/159; G01V 2001/526; G01V 1/523; E21B 47/005; E21B 47/0025
See application file for complete search history.

(56) References Cited

U.S. PATENT DOCUMENTS 4,800,537 A * 1/1989 Mount, II ............. E21B 47/005
367/35
5,033,032 A * 7/1991 Houghtaling ......... B06B 1/0688
367/160
(Continued)

FOREIGN PATENT DOCUMENTS

EP         2990593 A1 *  3/2016  ............. E21B 47/12
WO     2014139593 A1     9/2014
WO     2015082702 A2     6/2015

OTHER PUBLICATIONS

First Examination Report issued in the prosecution of the Gulf Cooperation Council patent application No. GC2019-37748, dated Jul. 20, 2020, 4 pages.
(Continued)

*Primary Examiner* — Ian J Lobo
(74) *Attorney, Agent, or Firm* — Bracewell LLP; Keith R. Derrington

(57) ABSTRACT

An outer tubular is imaged by a pad assembly disposed within an inner tubular inserted within the outer tubular. The pad assembly is in contact with the inner tubular, and includes an acoustic pressure source, a backing mounted to a side of the acoustic pressure source, and an intervening layer between the acoustic pressure source and inner tubular. Signals generated by the pad assembly propagate radially outward from the inner tubular and reflect from the outer tubular. The generated and reflected signals travel through a medium between the inner and outer tubulars. An estimate of the distance between the inner and outer tubulars is based on the time from generation of the signal to when the reflected signal is sensed.

17 Claims, 7 Drawing Sheets

(51) Int. Cl.
  *G01V 1/02*    (2006.01)
  *E21B 47/002*  (2012.01)

(56) References Cited

U.S. PATENT DOCUMENTS

| | | | |
|---|---|---|---|
| 5,146,050 A * | 9/1992 | Strozeski | G01V 1/52 |
| | | | 181/102 |
| 6,466,513 B1 | 10/2002 | Pabon et al. | |
| 7,013,997 B2 | 3/2006 | Vail, III | |
| 7,036,610 B1 | 5/2006 | Vail, III | |
| 7,836,950 B2 | 11/2010 | Vail, III et al. | |
| 8,201,625 B2 | 6/2012 | Almaguer | |
| 9,797,240 B2 | 10/2017 | Tunget | |
| 9,817,152 B2 | 11/2017 | Sofiienko et al. | |
| 9,863,222 B2 | 1/2018 | Morrow et al. | |
| 10,054,707 B2 | 8/2018 | Swett | |
| 10,633,965 B2 * | 4/2020 | Cooper | G01B 11/00 |
| 2013/0327139 A1 | 12/2013 | Goodman et al. | |
| 2014/0373619 A1 * | 12/2014 | Slay | G01N 3/32 |
| | | | 73/152.58 |
| 2016/0327675 A1 | 11/2016 | Donderici | |
| 2017/0350231 A1 * | 12/2017 | Merciu | E21B 49/00 |
| 2018/0128094 A1 * | 5/2018 | Merciu | G01V 1/50 |
| 2019/0376380 A1 * | 12/2019 | Zhang | E21B 47/005 |
| | | | 367/35 |

OTHER PUBLICATIONS

PCT International Search Report dated Oct. 23, 2019, issued in the prosecution of patent application PCT/US2019/037247, 3 pages.

* cited by examiner

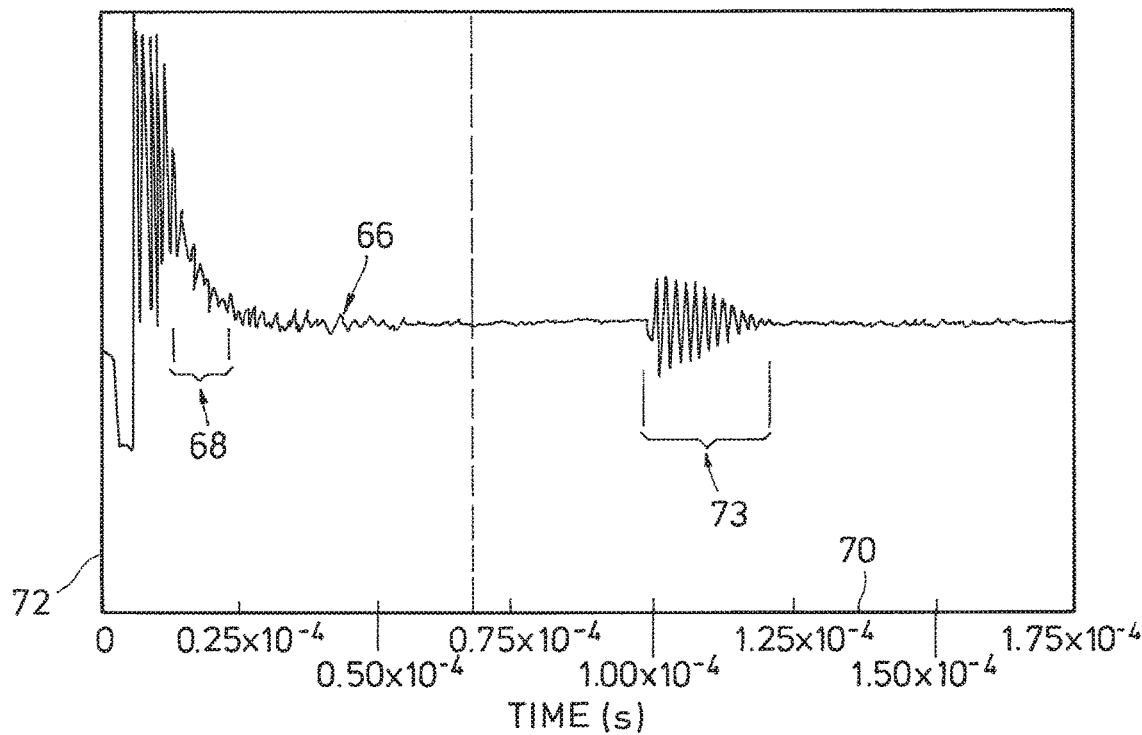
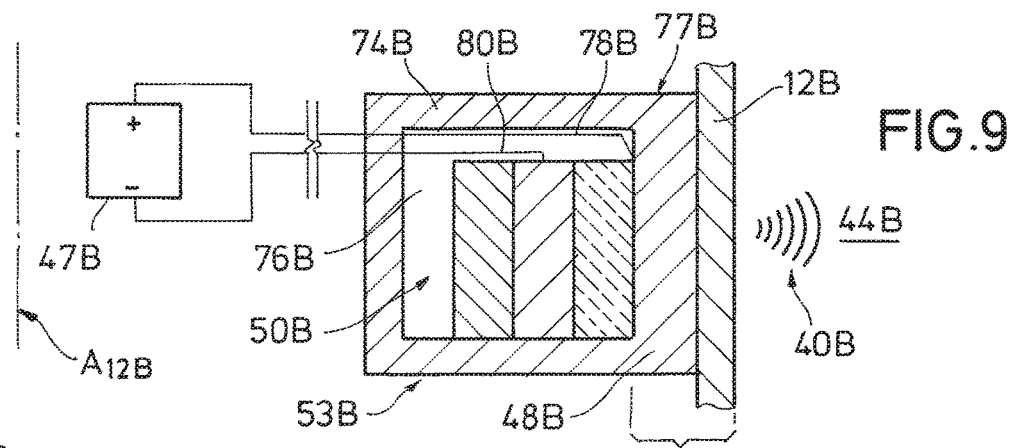
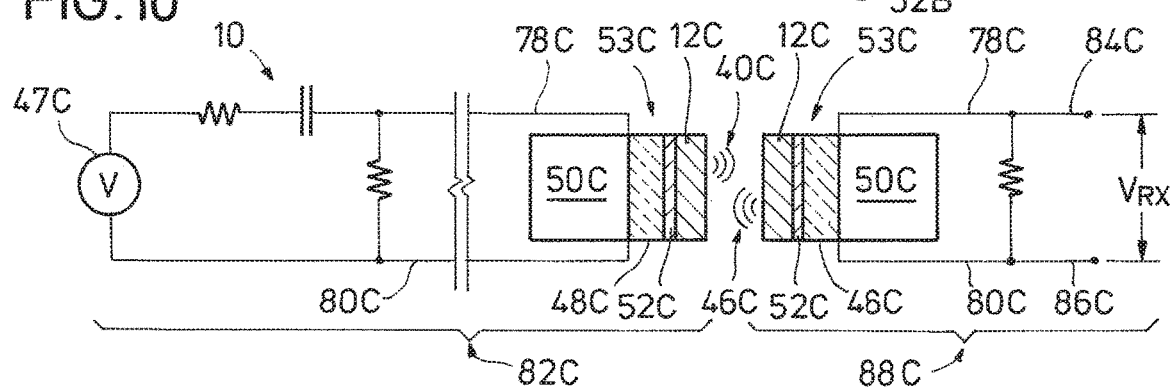

THROUGH TUBING ACOUSTIC IMAGING

CROSS-REFERENCE TO RELATED APPLICATION

This application claims priority to and the benefit of U.S. Provisional Application Ser. No. 62/685,348, filed Jun. 15, 2018, the full disclosure of which is incorporated by reference herein in its entirety and for all purposes.

BACKGROUND OF THE INVENTION

1. Field of Invention

The present disclosure relates to a downhole imaging system. More specifically, the present disclosure relates to a downhole imaging system that acoustically interrogates from within a tubular to areas outside of the tubular.

2. Description of Prior Art

Wellbores penetrating subterranean formation, such as those formed for hydrocarbon production, are typically lined with metal casing. The casing isolates the wellbore from the formation to prevent unwanted fluid or solids in the formation from entering the wellbore. Zones in the formation that are to be produced are typically communicated with the wellbore through perforations radially penetrating the casing. Cement is usually injected into an annular space between the casing and wellbore wall, which bonds the casing to the wellbore, and also isolates producing zones of different depths. Production tubing is generally inserted into the casing, and through which fluid produced from the formation is directed to the surface for further processing.

A need often arises to inspect a completed wellbore and after tubulars, such as casing and tubing, have been installed. Some wellbore items selected for inspection are the casing cement bond and the formation adjacent the casing. Currently known devices for inspecting the casing cement bond require removing the production tubing from the wellbore, which is time consuming and costly. Some imaging devices are deployed downhole through the production tubing, but the tubing position within the casing sometimes varies with depth and affects the accuracy of the imaged results.

SUMMARY OF THE INVENTION

Disclosed herein is an example method of imaging in a wellbore which includes inserting a pad assembly into an inner tubular that is disposed in the wellbore, forming an acoustic transmitter by contacting the pad assembly with the inner tubular, generating a vibration with the acoustic transmitter to form a transmitted signal that propagates radially outward from the inner tubular, into contact with an outer tubular that circumscribes the inner tubular, and through a medium disposed in an annulus between the inner tubular and outer tubular, using the pad assembly to sense a reflected signal that is formed by the transmitted signal reflecting from the outer tubular, and analyzing the reflected signal to obtain information about the outer tubular. In one example the pad assembly includes an electroactive material, a backing mounted to a side of the electroactive material, and an intervening layer on a side of the electroactive material opposite from the backing. The method further optionally includes adjusting a density of one or more of the backing, electroactive material, and intervening layer so that substantially all of the vibration is transformed into the transmitted signal. Types of information about the outer tubular optionally include an estimate of a distance between the inner tubular and outer tubular, and which is based on a time difference from when the transmitted signal is generated to when the reflected signal is sensed. In one example, the method also includes imaging a length of the inner tubular and estimating distances between the inner and outer tubulars along the length, and where the distances are used when imaging radially past the outer tubular. The inner tubular optionally is production tubing, and the outer tubular is casing that lines the wellbore. One type of information about the outer tubular includes that of a cement bond along the outer tubular.

Another method of imaging in a wellbore is disclosed, and which includes operating an acoustic transducer that is disposed in the wellbore having an inner tubular, generating a transmitted signal with the acoustic transducer that projects radially from the inner tubular, and reflects from an outer tubular that circumscribes the inner tubular to form a reflected signal, sensing the reflected signal, and estimating information about the outer tubular based on a characteristic of the reflected signal. In one embodiment, the information about the outer tubular includes positions of the outer tubular with respect to azimuthal locations of the inner tubular. In an alternative, the acoustic transducer is part of a first downhole tool and the method further includes deploying a second tool in the inner tubular and imaging a region radially past the outer tubular with the second tool, and wherein information about the region is obtained that is based on the step of imaging the region and the positions of the outer tubular with respect to azimuthal locations of the inner tubular. Examples exist where the acoustic transducer also includes a backing, an electroactive material mounted to the backing, and an intervening layer coupled along a surface of the electroactive material opposite from the backing and that is in contact with the inner tubular on a side opposite from the electroactive material. In one alternative, the electroactive material includes a piezoelectric transducer that vibrates in response to electricity. In one example, densities, sound speeds, and dimensions of the backing, electroactive material, and intervening layer are strategically selected so that vibrations from the piezoelectric transducer create fluctuations in acoustic pressure in a medium outside of the inner tubular to form the transmitted signal.

Also disclosed is a system for imaging in a wellbore which includes an acoustic transducer made up of a means for generating a transmitted signal that propagates radially outward from an inner tubular inserted in the wellbore to an outer tubular that circumscribes the inner tubular, and that reflects from the outer tubular to form a reflected signal, and a means for sensing the reflected signal, and where the system also includes a controller in communication with the acoustic transducer. The means for generating the transmitted signal optionally includes the inner tubular, an electroactive material, a backing mounted to a side of the electroactive material, and an intervening layer between the electroactive material and inner tubular. An embodiment exists where densities, sound speeds, and dimensions of the electroactive material, backing, and intervening layer are strategically selected so the transmitted signal is formed by causing the electroactive material to vibrate. In one example, the electroactive material, backing, and intervening layer make up a first pad assembly, and the system further includes a plurality of pad assemblies each having an electroactive material, backing, and intervening layer, a body, and arms each having an end pivotingly coupled to the body and an opposite end connected to a one of the pad assemblies.

BRIEF DESCRIPTION OF DRAWINGS

Some of the features and benefits of the present invention having been stated, others will become apparent as the description proceeds when taken in conjunction with the accompanying drawings, in which:

FIG. 8B is a graphic representation of a signal received by the imaging system of FIG. 8A.

FIG. 9 is a partial side sectional schematic view of an embodiment of an acoustic transducer for use with imaging systems disclosed herein.

FIG. 10 is a schematic circuit model representing an embodiment of the imaging systems disclosed herein.

Figure 1:
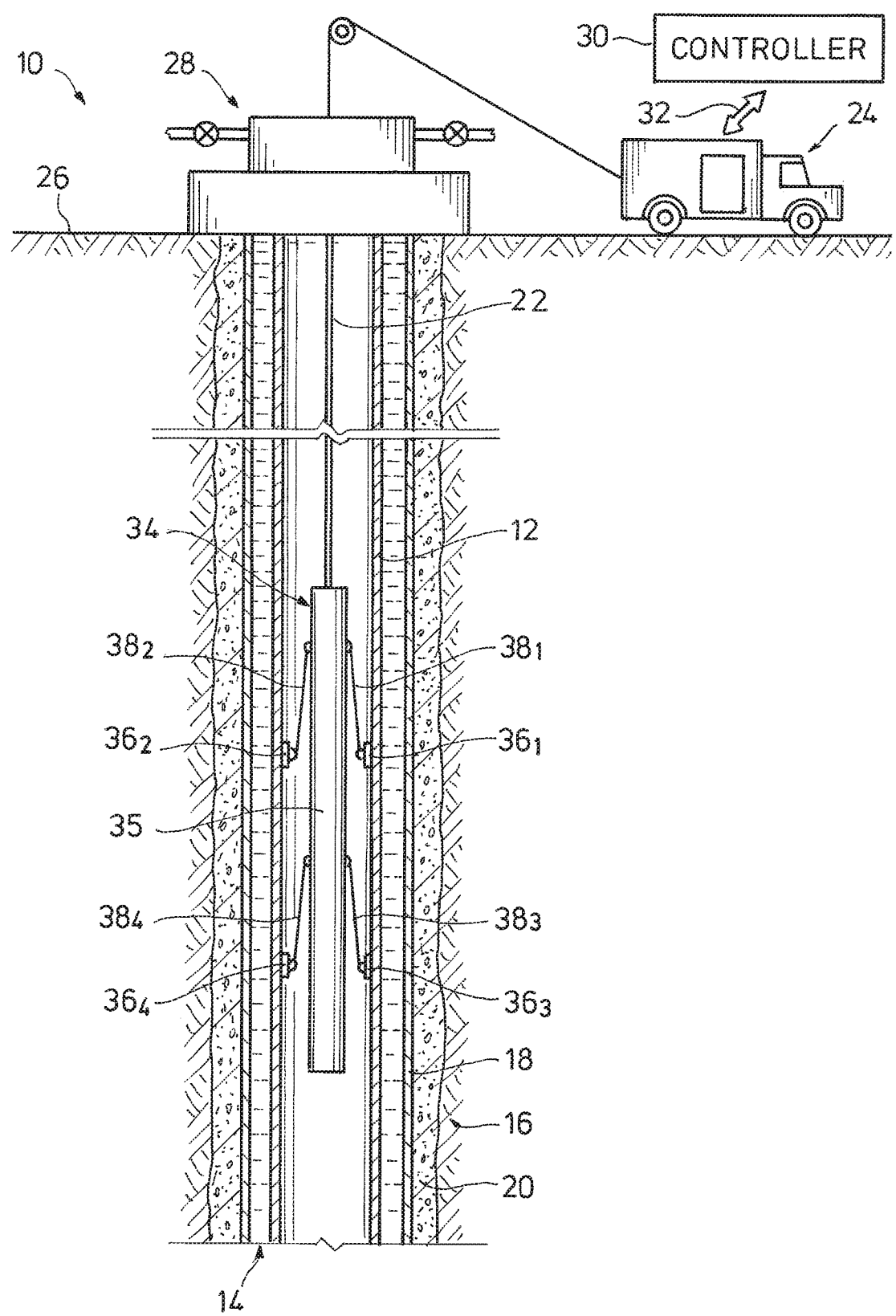
FIG. 1 is a side partial sectional view of an example of an imaging system disposed in a wellbore.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude. In an embodiment, usage of the term "generally" includes +/−10% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in a side sectional view in FIG. 1 is an example of an imaging system 10 for imaging within tubing 12 that is installed within a wellbore 14. Wellbore 14 intersects a formation 16, and is lined with casing 18 to selectively isolate wellbore 14 from fluid communication with formation 16. Further in this example, cement 20 fills the annular space between casing 18 and sidewalls of wellbore 14. In the illustrated embodiment, imaging system 10 includes a wireline 22 and a service truck 24 that is disposed on surface 26. As shown, an end of wireline 22 couples with service truck 24, which optionally includes a winch (not shown) for raising and lowering wireline 22 within wellbore 14. Also included with the example of the imaging system 10 of FIG. 1 is a controller 30, and which is optionally in communication with wireline 22. A wellhead assembly 28 is shown mounted over wellbore 14 on surface 26, and which provides pressure control for wellbore 14. In this example wireline 22 is routed through wellhead assembly 28. Communication means 32 is depicted that in one embodiment is hardwired, wireless, or any other currently known or later developed form of communication that provides a communication link between controller 30 and the rest of imaging system 10. In an example, communication means 32 is integrated within a service truck 24 and links communication through wireline 22.

An example of an imaging tool 34 is included with the imaging system 10 of FIG. 1, and shown disposed within tubing 12. Tool 34 includes an elongated housing 35 shown attached to an end of wireline 22 opposite from truck 24. Pad assemblies $36_{1-4}$ are included with this example of the imaging tool 34 shown mounted on ends of arms $38_{1-4}$. Ends of the arms $38_{1-4}$ distal from pad assemblies $36_{1-4}$ each attach to body 34 with pinned connections that form pivoting mounts that allow articulation of the arms $38_{1-4}$ and pad assemblies $36_{1-4}$ with respect to housing 35. In the example of FIG. 1 arms $38_{1-4}$ are depicted pivoted outward by their pinned connections to deploy pad assemblies $36_{1-4}$ radially outward from body 34. Examples of deployment means for the pad assemblies $36_{1-4}$ include springs and actuators (not shown). Other embodiments exist where pad assemblies $36_{1-n}$ are set adjacent to or within cavities (not shown) in the body 34 so that the pad assemblies $36_{1-4}$ avoid contact with other objects while being inserted into tubing 12. Further, in one example controller 30 receives signals from one or more of the pad assemblies $36_{1-4}$, such as through wireline 22 and communication means 32, where signals represent data sensed downhole in the wellbore 14.

Figure 2:
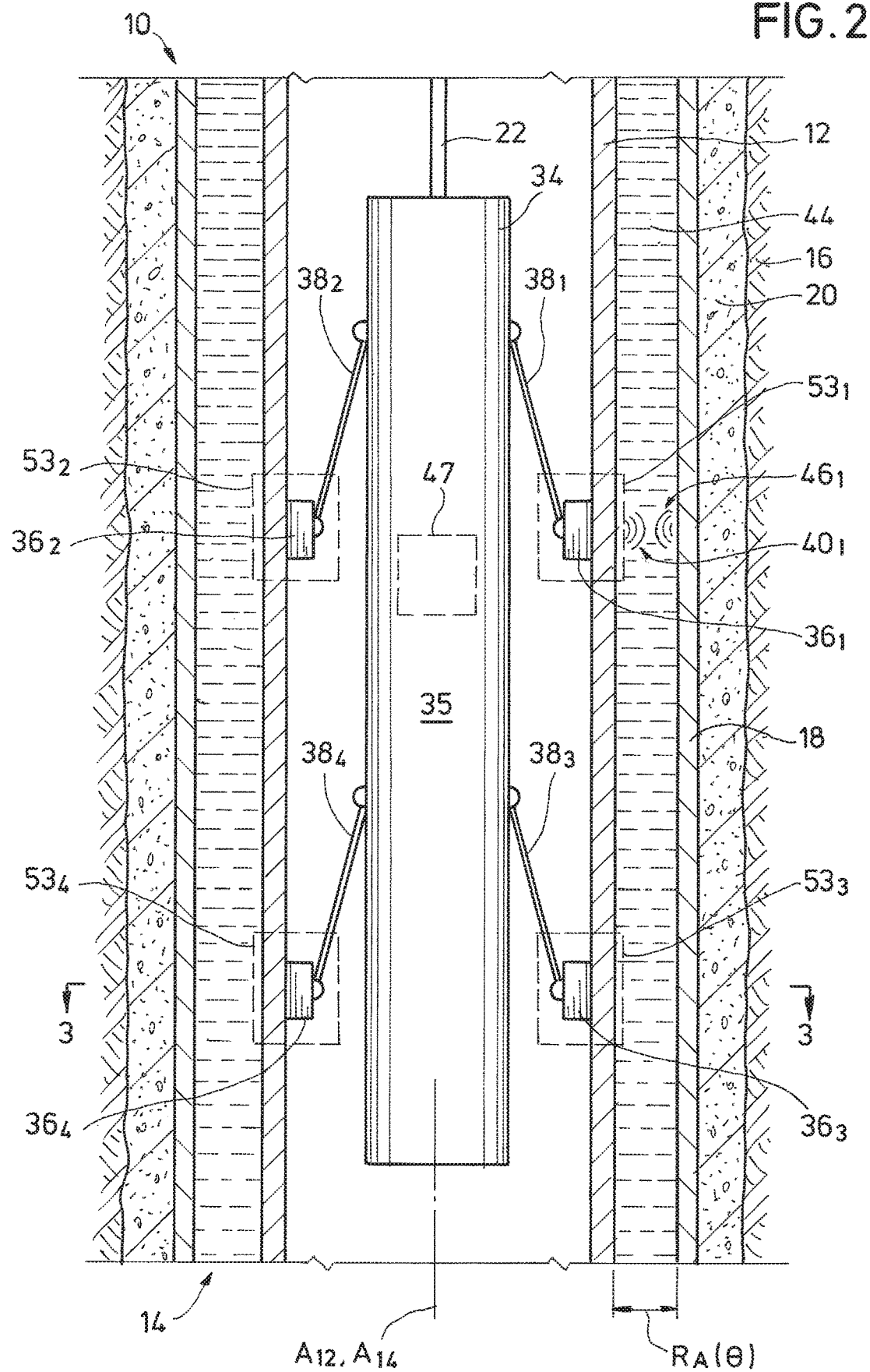
FIG. 2 is a side partial sectional view of a portion of an example of the imaging system of FIG. 1.

FIG. 2 is a side sectional view of an example of imaging system 10 shown in detail and disposed within wellbore 14. In the example of FIG. 2, axis $A_{12}$ of tubing 12 is generally aligned with axis $A_{14}$ of wellbore 14. A transmitted signal $40_1$ is schematically illustrated propagating radially from tubing 12 in a medium 42 that occupies an annulus 44 between tubing 12 and casing 18. Examples of medium 42 include air, water, connate fluid, brine, diesel, treatment fluid, drilling fluid, combinations thereof, and any other fluid that may be disposed within a wellbore. Further in this example, transmitted signal $40_1$ contacts and reflects from an inner surface of casing 18 to form a reflected signal $46_1$. As illustrated, reflected signal $46_1$ propagates radially inward through medium 42 and tubing 12, and is sensed by components within pad assembly $36_1$. For simplicity, signal $40_1$ of FIG. 2 is depicted as being generated with operation of pad assembly $36_1$; but embodiments exist where one or more of the pad assemblies $36_{2-4}$ also are equipped with components for generating transmitted signals and sensing reflected signals. In an example, a location where a transmitted signal is generated is positioned away and separate from a location where a corresponding reflected signal is sensed, such as at a different location on the same one of the pad assemblies $36_{1-4}$, a different location on a separate pad assembly $36_{1-4}$, as well as a different location in the wellbore 14. In an alternate embodiment, the imaging system 10 is equipped with greater or fewer than the four pad assemblies $36_{1-4}$. As described in more detail below, recording a time span between which a transmitted signal is generated and when its corresponding reflected signal is sensed yields a value of radius $R_{A(\Theta)}$ of annulus 44 between tubing 12 and casing 18. An optional power source 47 is schematically illustrated disposed in body 34 and which in an alternative provides power for operating pad assemblies $36_{1-4}$.

Figure 3:
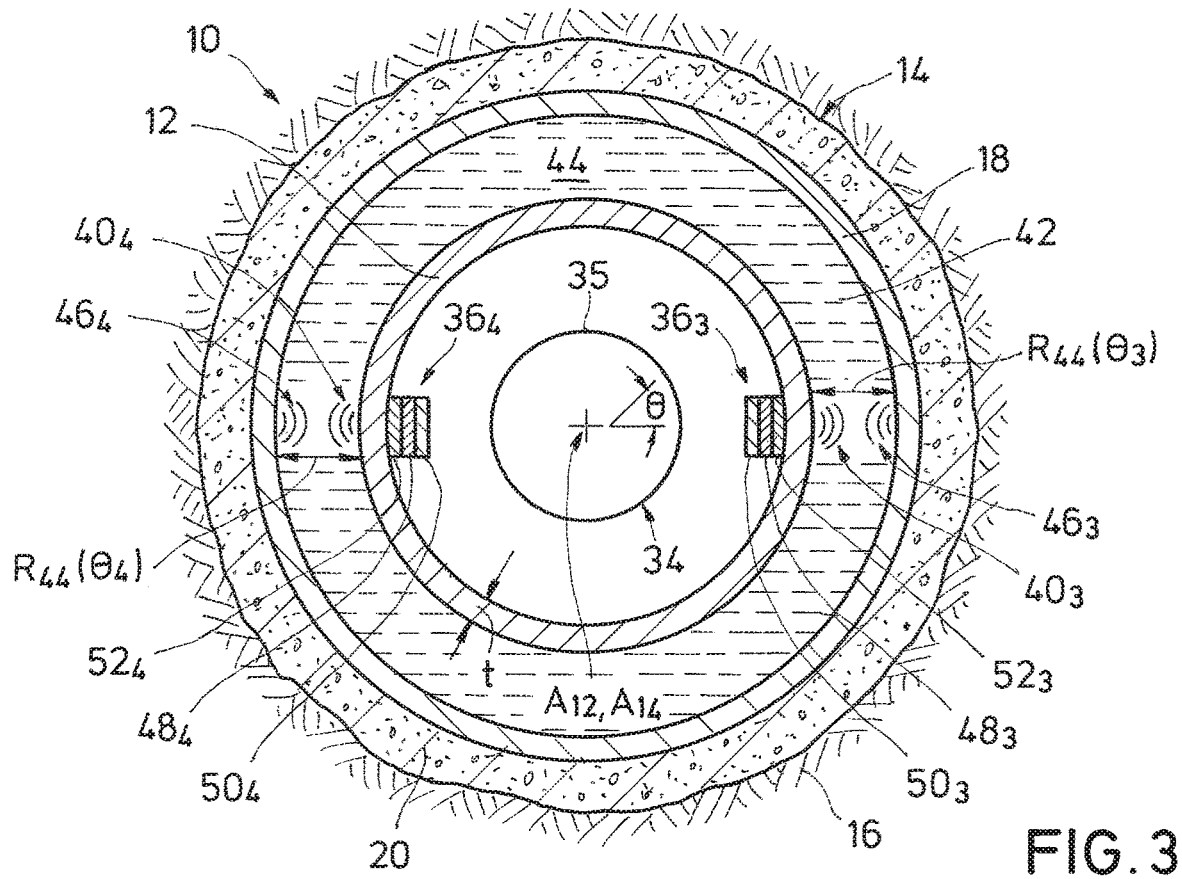
FIG. 3 is an axial sectional view of an example of the imaging system of FIG. 2 and taken along lines 3-3.

Referring now to FIG. 3, shown in an axial sectional view is a portion of imaging system 10 and taken along lines 3-3 of FIG. 2. In this example tubing Axis $A_{12}$ is substantially coaxial with wellbore Axis $A_{14}$ and values of the annulus radius $R_{44}(\Theta)$ are largely constant around the circumference of axis $A_{12}$ and the azimuth of tubing 12 and do not noticeably vary at different values of the azimuthal angle $\Theta$ around axis $A_{12}$. As shown, annulus radius $R_{44}(\Theta_4)$ proximate where pad $36_4$ is located has a magnitude substantially the same as annulus radius $R_{44}(\Theta_3)$ proximate where pad $36_3$ is located. In the illustrated example a time span between when transmitted signal $40_3$ is generated, and received signal $46_3$ is then sensed by pad assembly $36_3$, is largely the same as a time span from when transmitted signal $40_4$ is generated and received signal $46_4$ is then sensed by pad assembly $36_4$.

Figure 4:
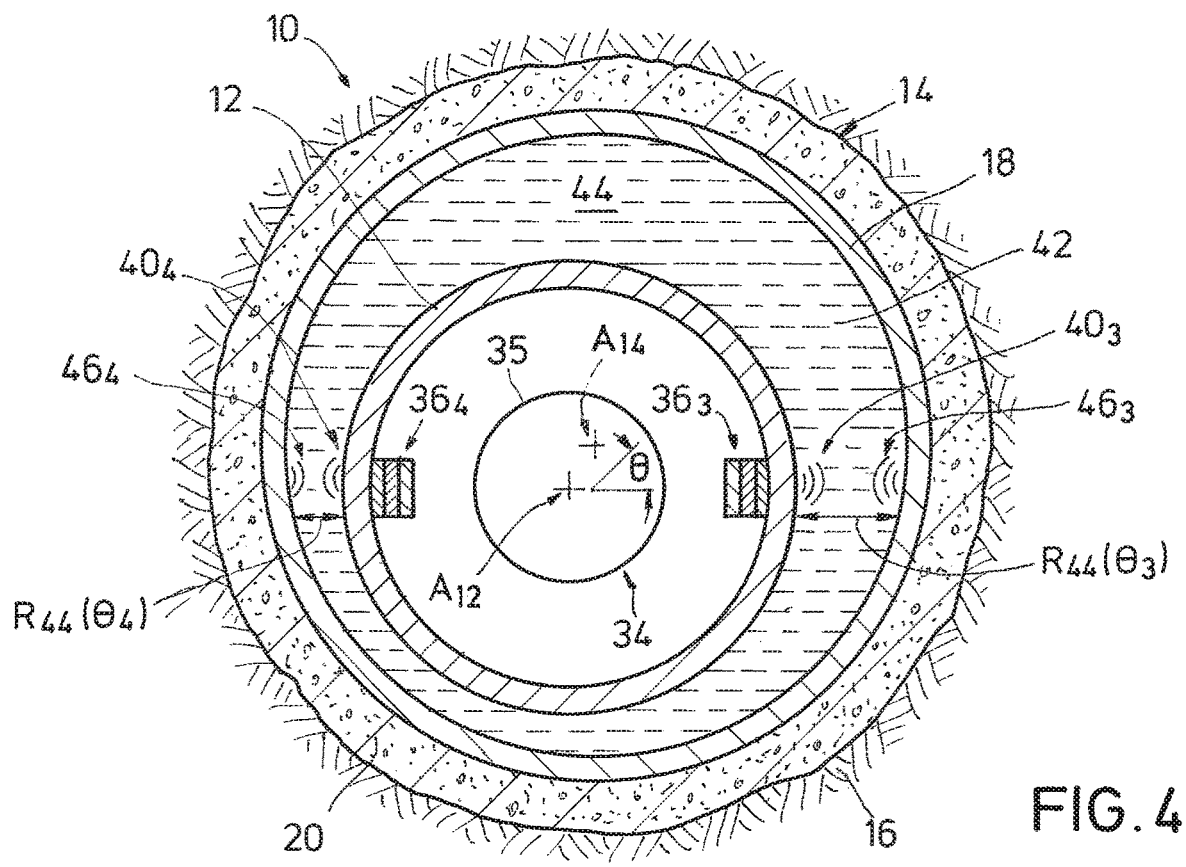
FIG. 4 is an axial sectional view of an example of the imaging system of FIG. 2 shown in tubing offset from an axis of the wellbore.

A contrasting example is illustrated in axial view in FIG. 4, where tubing 12 is oriented within casing 18 so that axis $A_{12}$ is offset from axis $A_{14}$. In this example magnitudes of the annulus radius $R_{A(\Theta)}$ do vary at different azimuthal angles $\Theta$ around axis $A_{12}$. As shown, annulus radius $R_{44}(\Theta_4)$ is less than annulus radius $R_{44}(\Theta_3)$, meaning the distances traveled by transmitted and received signals $40_4$, $46_4$ is less than that traveled by transmitted and received signals $40_3$, $46_3$. In the example of FIG. 4 signals $40_3$, $46_3$, $40_4$, $46_4$ travel within the same medium 42 and the surfaces from which they reflect have the same properties; so that the time span between when transmitted signal $40_3$ is generated, and received signal $46_3$ is then sensed by pad assembly $36_3$ exceeds the time span from when transmitted signal $40_4$ is generated and received signal $46_4$ is then sensed by pad assembly $36_4$. In an example of operation, the time differences between generating and sensing signals $40_3$, $46_3$, $40_4$, $46_4$ by pad assemblies $36_{3,4}$ are analyzed to estimate the orientation and location of tubing 12 within the casing 18. Other examples exist where further pad assemblies (not shown) are disposed at different azimuths around the imaging too 34 to obtain more precise measurements of the annulus radius $R_{44(\Theta)}$ around the circumference of tubing 12. In another example, the imaging system 10 is rotated within tubing 12 and additional data is gathered, which in an alternative provides a more precise indication of the orientation of tubing 12 within casing 18. Additional embodiments exist where one or both of transmitted signals $40_{3,4}$ reflect from an outer circumference of casing 18, or from an inner surface of wellbore 14 along formation 16. In this additional embodiment, the resulting reflected signals $46_{3,4}$ are analyzed to estimate the integrity of the cement 20, as well as the bonding between cement 20 and casing 18. In an example the signals are acoustic waves.

Referring back to FIG. 3, in an example each of the pad assemblies $36_{3,4}$ includes an electroactive material $48_{3,4}$ that responds to a stimulus by vibrating at a designated frequency. Examples of the electroactive material $48_{3,4}$ include an electroactive polymer, a piezoelectric material, combinations thereof, and the like. In an embodiment the piezoelectric material includes lead metaniobate ($PbNb_2O_6$). Example frequencies of vibration of the electroactive material $48_{3,4}$ include 605 kilohertz (kHz) and 825 kHz. In an alternative, a backing $50_{3,4}$ is included with each of the pad assemblies $36_{3,4}$ and which in one example is a tungsten powder/chip, and having an acoustic inductance of 10 MRayl. Embodiments exist having intervening layers $52_{3,4}$, respectively mounted on outer surfaces of the pad assemblies $36_{3,4}$. In an example intervening layers $52_{3,4}$ account for differences in acoustic impedance between electroactive material $48_{3,4}$ and medium 42 to maximize a transmission of acoustic signals $40_{3,4}$ from electroactive material $48_{3,4}$ into the medium 42. As discussed in more detail below, characteristics of the tubing 12 are considered in the design of intervening layers $52_{3,4}$ so that the combination of the intervening layers $52_{3,4}$ and tubing 12 operate together as a matching layer to maximize the transmission of transmitted signals $40_{3,4}$ into medium 42; such as by reducing or minimizing reflection of the transmitted signals $40_{3,4}$ that may otherwise occur at interfaces between the assemblies $36_{3,4}$ and tubing 12 and/or tubing 12 and medium 42. Designing or forming the assemblies $36_{1-4}$ to include the sidewall of the tubing 12 as an intervening layer removes the tubing 12 as a barrier to the transmission of the acoustic signal 40 into the medium, and operates to maximize transmission of the signal 40 in the medium 42. In one example, by maximizing transmission of an acoustic signal an acoustic pressure of a transmitted signal $40_{1-4}$ propagating in the medium 42 so that a reflected signal $46_{1-4}$ resulting from the transmitted signal $40_{1-4}$ has an acoustic pressure of sufficient magnitude to be sensed by a pad assembly $36_{1-4}$. An acoustic transducer whose intervening layers alone were considered for impedance matching calculations, would not generate signals of sufficient or proper transmissibility for use to estimate dimensions of the annulus 44 while inside the tubing 12. Thus significant advantages are realized by considering acoustic properties of the tubing 12 when designing an acoustic transducer for use inside the tubing 12. In a non-limiting example of use, intervening layers $52_{3,4}$ protect the electroactive material $48_{3,4}$. In one alternative, components described in conjunction with FIG. 3 and the pad assemblies $36_{3,4}$ are included with other pad assemblies of the imaging device 10. In an embodiment a thickness t of a sidewall of the tubing 12 is taken into account when establishing or determining a configuration and dimensions of the electroactive material $48_{3,4}$, back plate $50_{3,4}$, and intervening layer $52_{3,4}$. In one non-limiting example, thicknesses of each of the electroactive material $48_{1-4}$, back plate $50_{1-4}$, intervening layer $52_{1-4}$ are determined through an iterative process employing a transmission line equation, and where values of some of all of these thicknesses are selectively varied during the iterations. Alternatively, an acoustic impedance of material making up the tubing 12, or a combination of thickness t and acoustic impedance are considered when the configuration and dimensions of the electroactive material $48_{3,4}$, back plate $50_{3,4}$, and intervening layer $52_{3,4}$ are developed or designated. In an optional example, pad assemblies $36_{1-4}$ combined with tubing 12 define acoustic transducers $53_{1-4}$, and where the composite system of the pad assemblies $36_{1-4}$ and tubing 12 provides maximum and optimum transmission of signals through the tubing 12 and into the medium 42 that is in the annulus 44 between tubing 12 and casing 18.

Figure 5A:
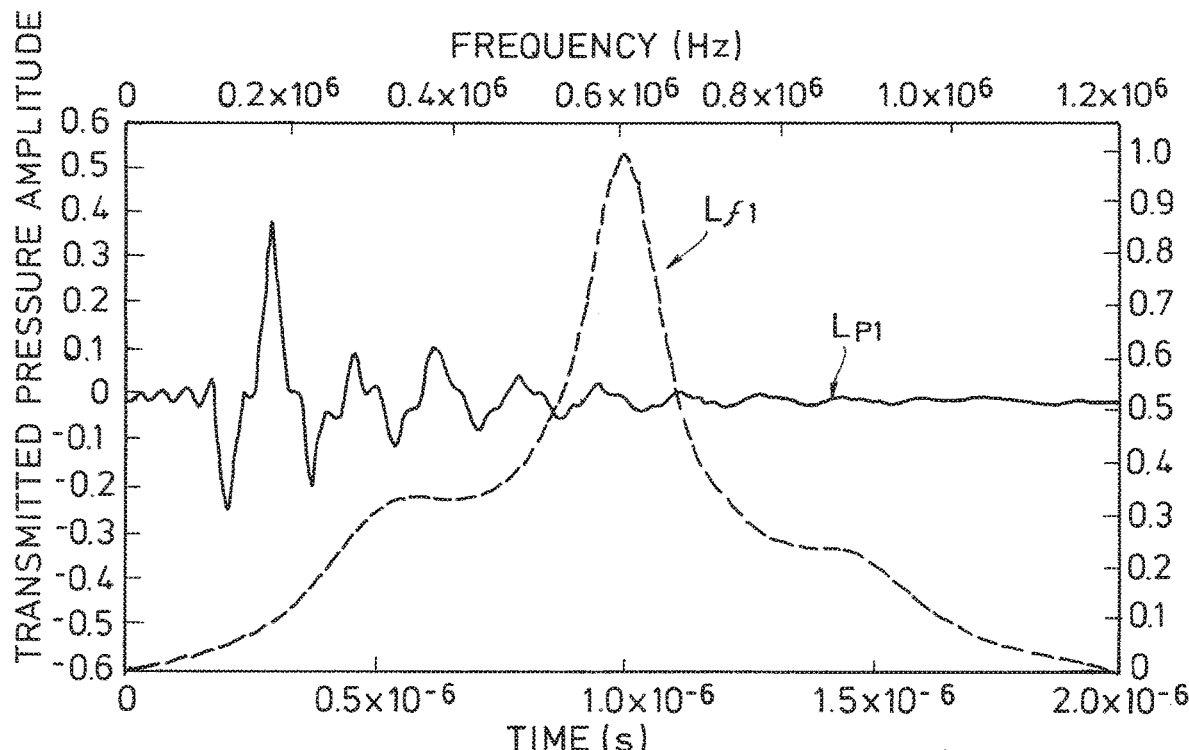
FIGS. 5A and 5B are graphical representations of modeled and measured responses of a transmitted acoustic signal in the time and frequency domains.
Figure 5B:
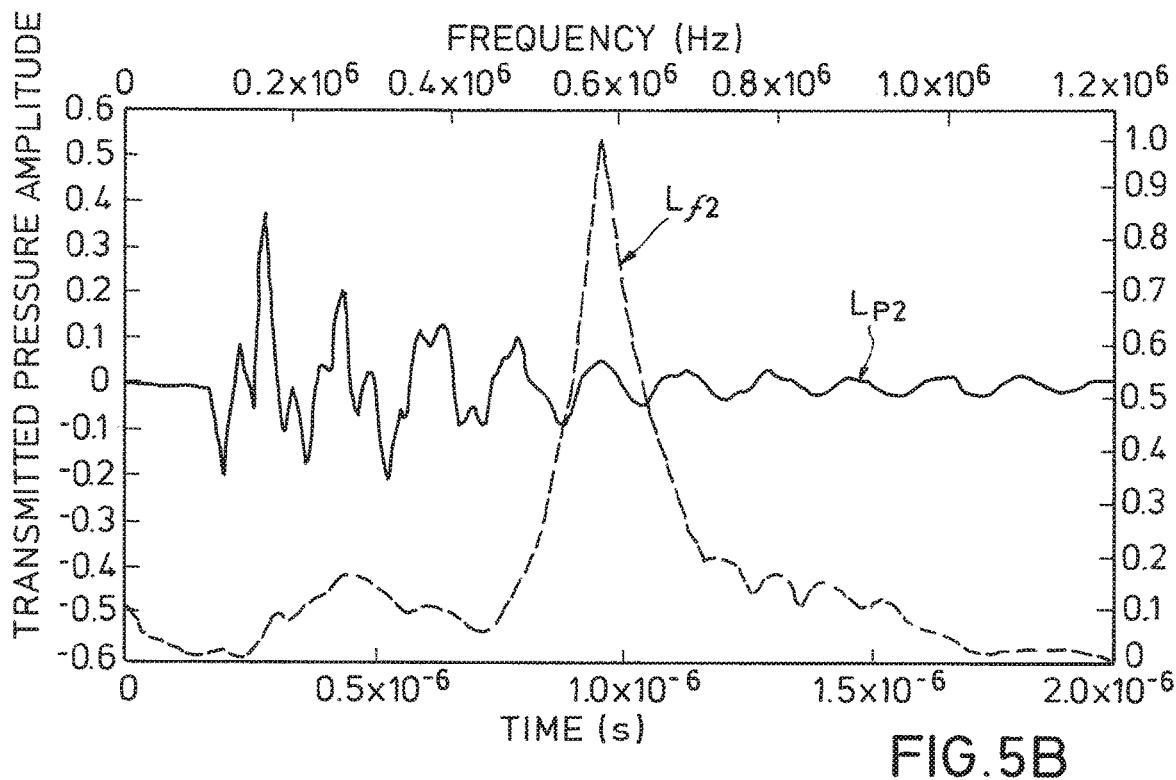

FIGS. 5A and 5B are graphical representations of amplitudes respectively of modeled and measured acoustic pressures in a medium over time, where changes in acoustic pressure result from a signal transmitted through the medium, and generated by a transducer having the following specifications: a 19 millimeter ("mm") thick disk of lead metaniobate ($PbNb_2O_6$) having an acoustic impedance of 19 Mrayl, and operating at 605 kHz, a backing with an acoustic impedance of 10 Mrayl, 5.4 mm thick steel tubing, and a 2 mm thick intervening layer between the disk and steel tubing. Line $L_{P1}$ in FIG. 5A represents modeled values of acoustic pressure over time, and line $L_{P2}$ of FIG. 5B represents measured values of acoustic pressure over time. Similarly, lines $L_{f1}$, $L_{f2}$ of FIGS. 5A and 5B each represent a frequency distribution of the signals over time, the values of which were respectively modeled and measured. As depicted in each of FIGS. 5A, 5B, a maximum of the measured pressures is at a frequency of around 600 kilohertz. As evident from FIGS. 5A and 5B, a comparison of lines $L_{P1}$, $L_{P2}$ and lines $L_{f1}$, $L_{f2}$ indicate there is good agreement between the technique used for modeling these values and actual measurements.

Figure 6A:
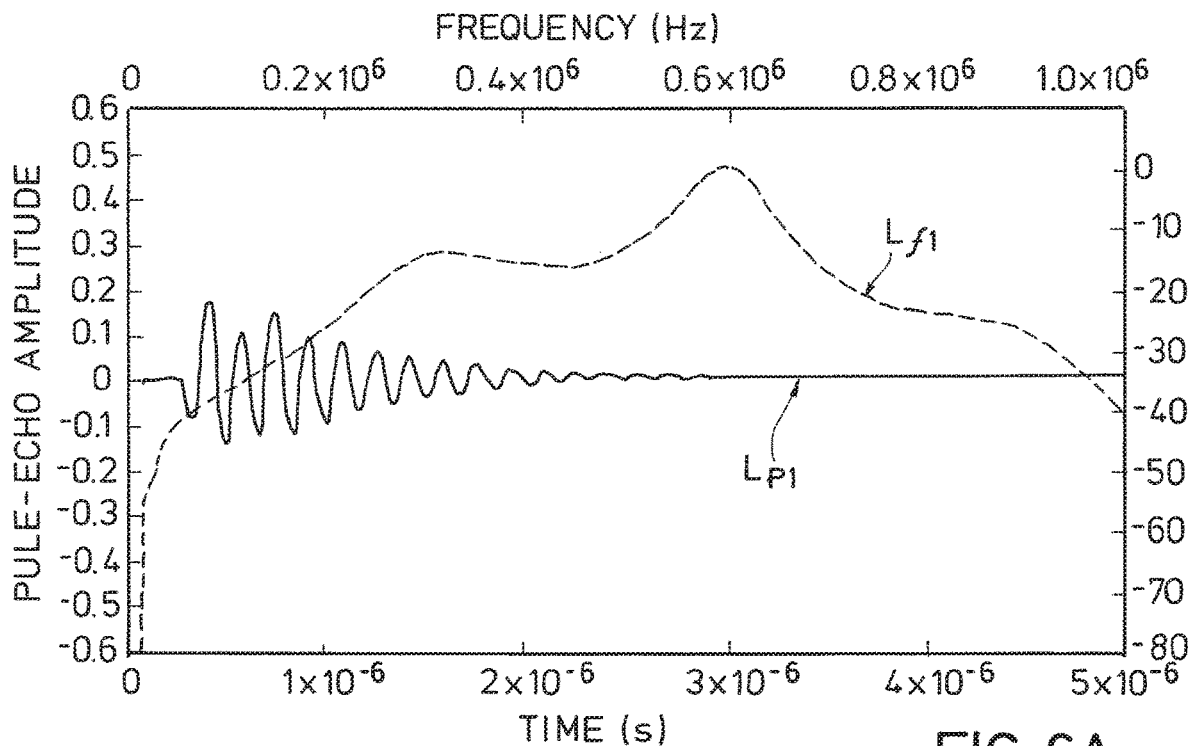
FIGS. 6A and 6B are graphical representations of modeled and measured responses of a received acoustic signal in the time and frequency domains.
Figure 6B:
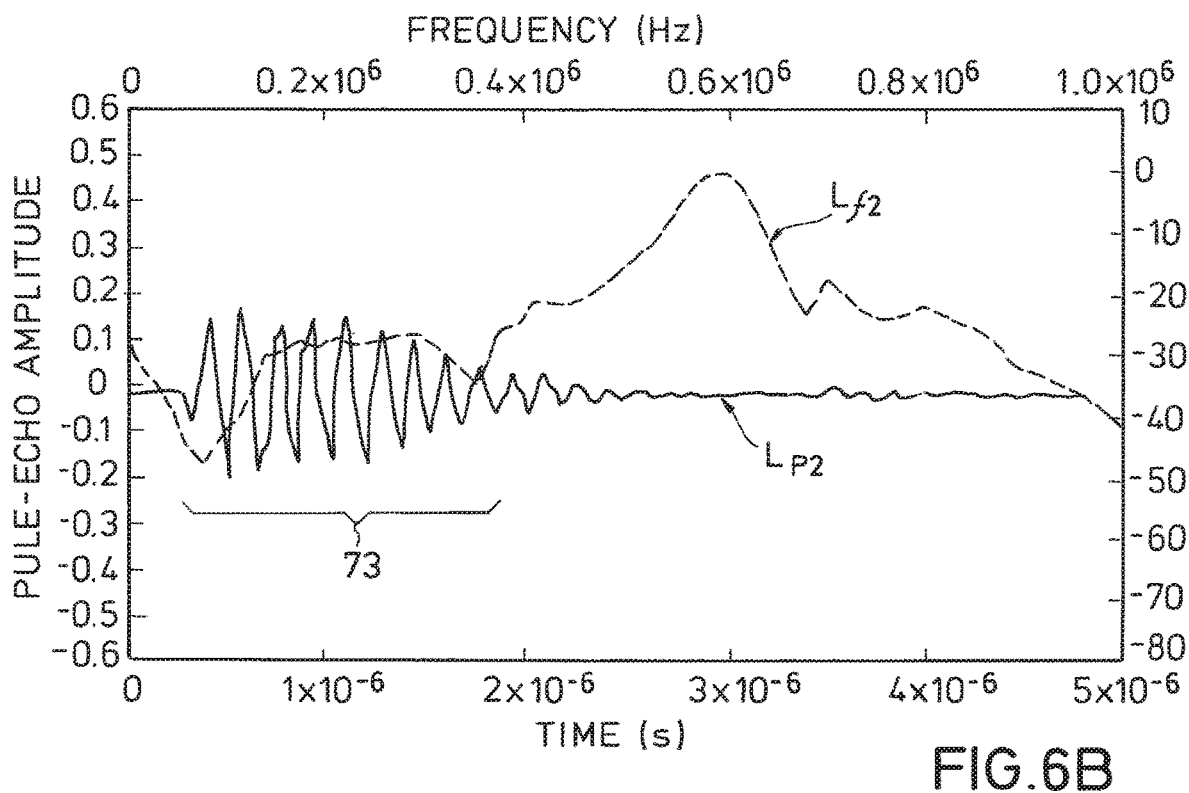

FIGS. 6A and 6B are graphical representations respectively of modeled and measured pulse echo amplitudes of a reflected signal sensed by the transducer. Similar to FIGS. 5A and 5B, line $L_{P1}$ in FIG. 6A represents modeled values of acoustic pressure over time, and line $L_{P2}$ of FIG. 6B represents measured values of acoustic pressure over time. Lines $L_{f1}$, $L_{f2}$ of FIGS. 6A and 6B each represent a frequency distribution of the signals over time, the values of which were respectively modeled and measured. Here also the maximum amplitude occurs at around 600 kilohertz; and good agreement is found between the modeled and measured frequency and acoustic pressures of the reflected signal. In this example, the steel plate thickness and steel tubing is taken to be one half of a wave length of the transmitted signal.

Figure 7:
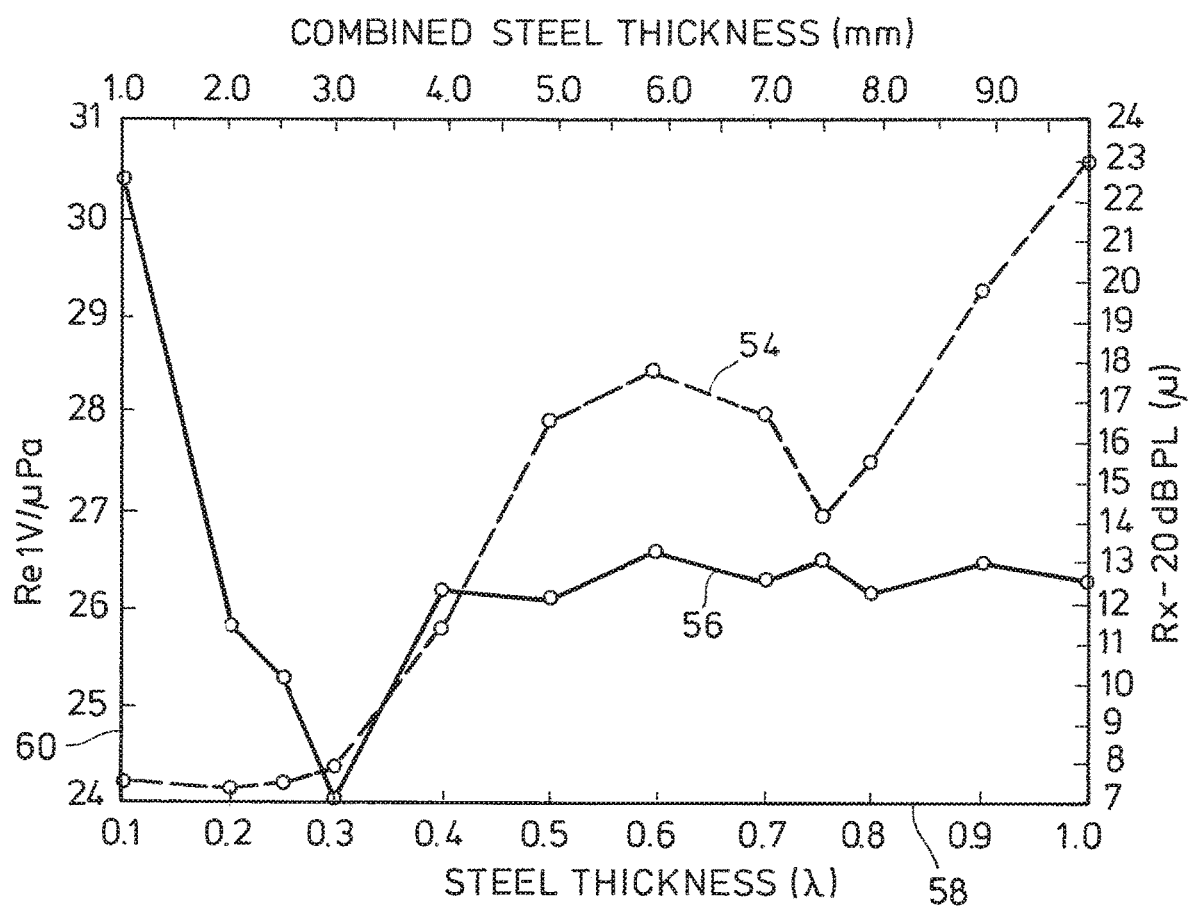
FIG. 7 is a graphical representation of a modeled pulse echo response.

Graphically illustrated in FIG. 7 are amplitudes of acoustic pressure and pulse length of a pulse echo response obtained by modeling of a transducer having the same or similar specifications as that used in FIGS. 5A, 5B and 6A, 6B. FIG. 7 further includes modeled results of an assembly equipped with different steel plates having thicknesses ranging from 1 mm to 9.8 mm, and in increments of 1 mm. Line 54 is graphically illustrated in FIG. 7, and which represents magnitudes of measured pressure of a transmitter. Also in FIG. 7 is line 56, which graphically represents pulse lengths of the modeled signals. In one example, minimizing pulse length yields a coherent time resolution of the casing caliper, casing thickness, and cement loading. Thicknesses of the steel plates are illustrated along the abscissa 58 of the figure, provided along the ordinate 60 are values of the measured amplitude, which are in dB Re 1V/μPa. Abscissa 58 represents modeled thickness values of intervening layers plus thickness of tubing sidewall. In this example, measurable signals of the transmitted and reflected waves are clearly available having a plate thickness (i.e. intervening layer(s) plus tubing) of 0.5 to 0.8 of the wave length of the signals. Modeled values of a total combined thickness of the intervening layer(s) and tubing are provided along upper abscissa. Also evident from lines 54, 56 of FIG. 7 is that a transducer assembly with a plate thickness of 0.25λ, which is typical in many known transducer systems, would not generate a readable pulse echo signal.

Figure 8A:
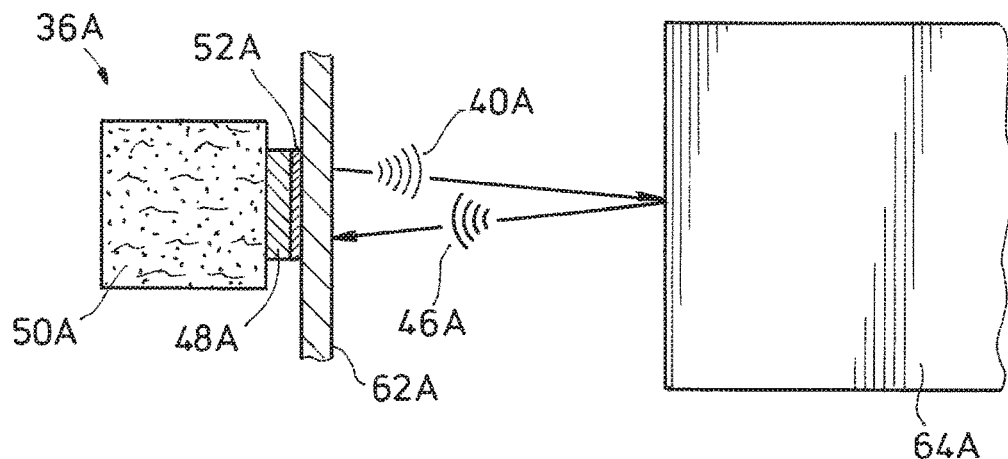
FIG. 8A is a schematic of an acoustic imaging system used for analysis.

Schematically shown in FIG. 8A is one example of an experimental setup of a pad assembly 36A with an electroactive material 48A mounted onto a back plate 50A, and an intervening layer 52A on a surface of electroactive material 48A distal from back plate 50A. Intervening layer 52A is shown in contact against a plate 62A, where plate 62A represents tubing. Activation of the electroactive material 48A generates a transmitted signal 40A that contacts a mass 64A spaced a distance from plate 62A and on a side opposite from material 48A. Reflected signal 46A is created by transmitted signal 40A contacting and reflecting from mass 64A; where mass 64A represents casing. In the illustrated example, electroactive material 48A, intervening layer 52A, and plate 62A are depicted as slab like members, and back plate 50A and mass 64A are shown as having box like configurations. Reflected signal 46A is sensed by a voltmeter (not shown) coupled with the electroactive material 48A.

Provided in FIG. 8B is an example of a line 66 which represents the pulse echo amplitude measured over time of the reflected signal 46A. A region 68 is depicted on a portion of line 66 that includes portions of reflected signal 46A, and which represents reverberations within pad assembly 36A and between layer 52A and plate 62A. Abscissa 70 of FIG. 8B represents values of time in seconds, and ordinate 72 represents magnitudes of the pulse echo amplitude. Another region 73 in line 66 represents an echo from mass 64A (FIG. 8A); in an alternative, analyzing echo yields information about quality of the cement 20 bond between the casing 18 to formation 16 (FIG. 2), casing caliper, casing thickness, and cement loading on the casing. The pulse echo signal is a reflection of an original signal generated by a transducer formed in accordance with the optimization approach described herein, and so that a thickness of the intervening layer(s) plus tubing is about 0.6λ. As evident from the width and amplitude of the signal in the region 73 of FIG. 8B, a pulse echo signal generated by a transducer formed in accordance with the present disclosure is sufficiently discernable to be sensed and to provide information for use in acoustic imaging.

An alternate example of an acoustic transducer 53B is schematically illustrated in side sectional view in FIG. 9 and in abutting contact with an inner surface of tubing 12B. In this example, transducer 53B includes a housing 74B having a chamber 76B formed to receive electroactive material 48B and backing 50B. Chamber 76B selectively contains fluid, such as a dielectric fluid, that is optionally pressure equalized to ambient to minimize pressure differentials across walls of the housing 74B. Housing 74B further provides a protective covering for electroactive material 48B and backing 50B. In an embodiment, the intervening layer 52B is a combination of the sidewall of tubing 12B, and sidewall 77B of housing 74B abutting tubing 12B.

Still referring to FIG. 9, leads 78B, 80B are further illustrated that provide electrical communication between power source 47B and electroactive material 48B. In an example of operation, energizing electroactive material 48B by communicating electricity from power source 47B via leads 78B, 80B causes vibration in electroactive material 48B, which in combination with the remaining components of the acoustic transducer 53B having strategically selected densities, sound speed, and dimensions, generates a transmitted signal 40B that propagates radially away from axis $A_{12B}$ and into annulus 44B. In the example illustrated, backing 50B is made up of two layers of backing material laminated together; alternate embodiments exist where backing 50B is monolithic, or made up of more than two layers. In a non-limiting example, transducer 53B is tuned by varying characteristics of the backing 50B; such as density and thickness.

An example of imaging system 10C is schematically represented as an electrical circuit in FIG. 10. A portion of the schematic having components of the acoustic transducer 53C and energized by power source 47C is depicted as a transmitter model 82C. A portion of the schematic having components of the acoustic transducer 53C and leads 84C, 86C is depicted as a receiver model 88C. Each of the transmitter and receiver models 82C, 88C include an example of the acoustic transducer 53C, and which are illustrated separated from one another by medium 42C. Further illustrated are examples of transmitted signal 40C in medium 42C, and which is generated by components of transmitter model 82C as described above. Further represented in FIG. 10 is a reflected signal 46C, which is sensed by components in receiver model 88C, and as described above. Leads 84C, 86C each have an end connected to electroactive material 48C, and free ends, opposite from the ends connected to the electroactive material 48C, and that are spaced away from one another. When sensing reflected signal 46C with the acoustic transducer 53C, a potential is created between the free ends of leads 84C, 86C, and which is represented in FIG. 10 as $V_{RX}$. It has been found that designing acoustic transducer 53C to obtain a maximum value of $V_{RX}$, and including the tubular 12C as a part of the acoustic transducer 53C, generates a transmitted wave 40C that propagates radially from the tubular 12C into the medium 42C and not in the tubular 12C. Further alternatives to the novel discovery include setting the dimensions and material characteristics of the tubing as given and not variable, and strategically varying one or more of the density, sound speed, and dimensions of the remaining components of the acoustic transducer.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. In one example, an electromagnetic acoustic transmitter is used in combination with, or in place of, an electroactive material. In a specific example, an electromagnetic acoustic transmitter is included for use in one or more of the acoustic transducers $53_{1-4}$; and alternatives exist where the electromagnetic transducer is disposed in the one or more of the acoustic transducers $53_{1-4}$ with an electromagnetic material. These and other similar modifications will readily suggest themselves to those skilled in the art, and are intended to be encompassed within the spirit of the present invention disclosed herein and the scope of the appended claims.

What is claimed is:

1. A method of imaging in a wellbore comprising:
   providing a pad assembly for use with an inner tubular disposed in the wellbore, the pad assembly comprising an electroactive material and an intervening layer coupled with the electroactive material;
   inserting the pad assembly into the inner tubular;
   contacting the inner tubular with the intervening layer to form an acoustic transmitter that comprises a matching layer made up of the intervening layer and the inner tubular;
   generating a vibration with the acoustic transmitter to form a transmitted signal that propagates radially outward from the inner tubular, through a medium disposed in an annulus formed between the inner and outer tubulars, and into contact with the outer tubular;
   matching impedance of the electroactive material and the medium with the matching layer by adjusting a design of the intervening layer based on a given characteristic of the inner tubing;
   using the pad assembly to sense a reflected signal that is formed by the transmitted signal reflecting from an outer tubular in the wellbore and that circumscribe the inner tubular; and
   analyzing the reflected signal to obtain information about the outer tubular.

2. The method of claim 1, wherein adjusting a design of the intervening layer comprises varying one or more of the density, sound speed, and dimension of the intervening layer.

3. The method of claim 1, wherein a thickness of the electroactive material is based on a thickness and impedance of the inner tubing, and wherein a thickness of the intervening layer and of the tubing is about 0.6 of a wavelength of the acoustic signal.

4. The method of claim 1, wherein the information about the outer tubular comprises an estimate of a distance between the inner tubular and outer tubular, and which is based on a time difference from when the transmitted signal is generated to when the reflected signal is sensed.

5. The method of claim 1, further comprising imaging a length of the inner tubular and estimating distances between the inner and outer tubulars along the length, and where the distances are used when imaging radially past the outer tubular.

6. The method of claim 1, wherein the inner tubular comprises production tubing, and the outer tubular comprises casing that lines the wellbore.

7. The method of claim 1, wherein the information about the outer tubular comprises a cement bond along the outer tubular.

8. A method of imaging in a wellbore comprising:
   using an electroactive material to generate a signal within a wellbore inner tubular so that the signal projects radially from the inner tubular into a surrounding liquid medium, and reflects from an outer tubular that circumscribes the inner tubular to form a reflected signal;
   matching an impedance of the electroactive material to an impedance of the medium with a matching layer that comprises the inner tubular and an intervening layer coupled between the inner tubular and the electroactive material;
   maximizing transmission of the signal in the medium by adjusting a dimension of the intervening layer based on a given dimension of the inner tubing;
   sensing the reflected signal; and
   estimating information about the outer tubular based on a characteristic of the reflected signal.

9. The method of claim 8, wherein the information about the outer tubular comprises positions of the outer tubular with respect to azimuthal locations of the inner tubular.

10. The method of claim 9, wherein the acoustic transducer is part of a first downhole tool, the method further comprising deploying a second tool in the inner tubular and imaging a region radially past the outer tubular with the second tool, and wherein information about the region is obtained that is based on the step of imaging the region and the positions of the outer tubular with respect to azimuthal locations of the inner tubular.

11. The method of claim 8, wherein the acoustic transducer further comprises a backing.

12. The method of claim 8, wherein the electroactive material comprises a piezoelectric transducer that vibrates in response to electricity, and wherein the transmitted signal generated by the piezoelectric transducer has a wavelength that is about 0.6 of the thickness of the intervening layer and the inner tubular.

13. The method of claim 8, wherein densities, sound speeds, and dimensions of the backing, electroactive material, and intervening layer are strategically selected so that vibrations from the acoustic transducer create fluctuations in acoustic pressure in the medium outside of the inner tubular to form the transmitted signal.

14. A system for imaging in a wellbore comprising:
an acoustic transducer that is selectively inserted into a tubular in the wellbore and that comprises,
an electroactive material for generating a signal,
a matching layer for matching impedance of the electroactive material to an impedance of a medium outside the tubular, the matching layer comprising;
the tubular, and
an intervening layer having an inner surface in contact with the electroactive material, an outer surface in contact with the tubular, and a thickness based on a given characteristics of the tubular, and
a means for sensing the reflected signal; and
a controller in communication with the acoustic transducer.

15. The system of claim 14, wherein dimensions of the electroactive material are based on a thickness and impedance of the tubular.

16. The system of claim 15, wherein the tubular comprises an inner tubing that is inserted into an outer tubular that is disposed in the wellbore.

17. The system of claim 15, wherein the electroactive material, a backing, and intervening layer comprise a first pad assembly, the system further comprising a plurality of pad assemblies each comprising an electroactive material, backing, and intervening layer, a body, and arms each having an end pivotingly coupled to the body and an opposite end connected to a one of the pad assemblies.

* * * * *